United States Patent
Gupta et al.

(10) Patent No.: US 10,862,862 B2
(45) Date of Patent: Dec. 8, 2020

(54) IDENTIFYING DEVICES ON A REMOTE NETWORK

(71) Applicant: Avast Software s.r.o., Prague (CZ)

(72) Inventors: Rajarshi Gupta, Los Altos, CA (US); Joe Anakata, Alameda, CA (US); Richard Kmieciak, San Francisco, CA (US)

(73) Assignee: Avast Software s.r.o., Prague (CZ)

( * ) Notice: Subject to any disclaimer, the term of this patent is extended or adjusted under 35 U.S.C. 154(b) by 0 days.

(21) Appl. No.: 16/205,074

(22) Filed: Nov. 29, 2018

(65) Prior Publication Data

US 2019/0166091 A1 May 30, 2019

Related U.S. Application Data

(60) Provisional application No. 62/592,980, filed on Nov. 30, 2017.

(51) Int. Cl.
*H04L 29/12* (2006.01)
*H04L 29/08* (2006.01)

(52) U.S. Cl.
CPC ...... *H04L 61/2571* (2013.01); *H04L 61/2015* (2013.01); *H04L 61/2514* (2013.01); *H04L 67/12* (2013.01)

(58) Field of Classification Search
CPC ..... H04L 12/66; H04L 67/12; H04L 61/2015; H04L 61/2514; H04L 61/2571; H04L 29/12367; Y04S 40/18
USPC ....................................................... 709/223
See application file for complete search history.

(56) References Cited

U.S. PATENT DOCUMENTS

| 8,180,892 | B2 * | 5/2012 | Deridder | H04L 67/02 709/224 |
| 2003/0233576 | A1 * | 12/2003 | Maufer | H04L 63/164 709/226 |
| 2005/0114495 | A1 * | 5/2005 | Clemm | H04L 29/12009 709/224 |
| 2011/0182290 | A1 * | 7/2011 | Perkins | H04L 29/12066 370/389 |
| 2012/0136976 | A1 * | 5/2012 | Krishnan | H04L 61/2514 709/223 |
| 2013/0058256 | A1 * | 3/2013 | Li | H04L 61/2517 370/255 |

(Continued)

OTHER PUBLICATIONS

Groat, Stephen. "Privacy and Security in IPv6 Addressing" Apr. 21, 2011. pp. 1-56 (Year: 2011).*

(Continued)

*Primary Examiner* — John M MacIlwinen
(74) *Attorney, Agent, or Firm* — Erickson Kernell IP, LLC

(57) ABSTRACT

A device identification module identifies devices on a remote network, where the remote network may use Network Address Translation techniques. The device identification module can receive a list of devices on the remote network. The devices in the remote network can be identified by the device classification module based, at least in part, on the device classification and one or more of Dynamic Host Configuration Protocol (DHCP) information for the remote network, port sequences used in Network Address Translation on the remote network, and a live Uniform Resource Locator (URL) check performed on the remote network.

17 Claims, 3 Drawing Sheets

(56) References Cited

U.S. PATENT DOCUMENTS

2016/0164831 A1* 6/2016 Kim .................. H04L 43/08

OTHER PUBLICATIONS

Verde et al., "No NAT'd User left Behind": Fingerprinting Users behind NAT from NetFlow Records alone, 2014 IEEE 34th International Conference on Distributed Computing Systems, Jun. 30-Jul. 3, 2014, 11 pages, The Institute of Electrical and Electronics Engineers, Inc.
Lyon, Gordon "Fyodor", The Official Nmap Project Guide to Network Discovery and Security Scanning, Table of Contents, 2011, 13 pages, Insecure.Com LLC, https://web.archive.org/web/20161017225451/https://nmap.org/book/toc.html. Accessed Feb. 26, 2019.
Lyon, Gordon "Fyodor", The Official Nmap Project Guide to Network Discovery and Security Scanning, TCP/IP Fingerprinting Methods Supported by Nmap, Chapter 8. Remote OS Detection, 2011, 10 pages, Insecure.Com LLC, https://web.archive.org/web/20160624005626/https://nmap.org/book/osdetect-methods.html. Accessed Feb. 26, 2019.
Lyon, Gordon "Fyodor", The Official Nmap Project Guide to Network Discovery and Security Scanning, IPv6 fingerprinting, Chapter 8. Remote OS Detection, 2011, 4 pages, Insecure.Com LLC, https://web.archive.org/web/20160624005723/https://nmap.org/book/osdetect-ipv6-methods.html. Accessed Feb. 26, 2019.
Lyon, Gordon "Fyodor", The Official Nmap Project Guide to Network Discovery and Security Scanning, Fingerprinting Methods Avoided by Nmap, Chapter 8. Remote OS Detection, 2011, 3 pages, Insecure.Com LLC, https://web.archive.org/web/20160624005739/https://nmap.org/book/osdetect-other-methods.html. Accessed Feb. 26, 2019.
Lyon, Gordon "Fyodor", The Official Nmap Project Guide to Network Discovery and Security Scanning, Understanding an Nmap Fingerprint, Chapter 8. Remote OS Detection, 2011, 8 pages, Insecure.Com LLC, https://web.archive.org/web/20160624010417/https://nmap.org/book/osdetect-fingerprint-format.html. Accessed Feb. 27, 2019.
Introduction to Cisco IOS NetFlow—A Technical Overview, White Paper, May 29, 2012, 14 pages, https://www.cisco.com/c/en/us/products/collateral/ios-nx-os-software/ios-netflow/prod_white_paper0900aecd80406232.html. Accessed Feb. 26, 2019.
Lamping et al., Wireshark User's Guide, Table of Contents, 2014, 9 pages, Ulf Lamping, Richard Sharpe, Ed Warnicke, https://web.archive.org/web/20160602140910/https://www.wireshark.org/docs/wsug_html_chunked/index.html. Accessed Feb. 27, 2019.
Lamping et al., Wireshark User's Guide, 4.13. Filtering while capturing, Chapter 4. Capturing Live Network Data, 2014, 3 pages, Ulf Lamping, Richard Sharpe, Ed Warnicke, https://web.archive.org/web/20160618042514/https://www.wireshark.org/docs/wsug_html_chunked/ChCapCaptureFilterSection.html. Accessed Feb. 26, 2019.
Lamping et al., Wireshark User's Guide, 6.3. Filtering packets while viewing, Chapter 6. Working with captured packets, 2014, 3 pages, Ulf Lamping, Richard Sharpe, Ed Warnicke, https://web.archive.org/web/20160618041014/https://www.wireshark.org/docs/wsug_html_chunked/ChWorkDisplayFilterSection.html. Accessed Feb. 26, 2019.
Garcia, Luis Martin, Programming with Libpcap—Sniffing the Network From Our Own Application, Hakin9, Feb. 2008, 9 pages, vol. 3, No. 2.
Tcpdump, Oct. 2, 2016, 19 pages, https://web.archive.org/web/20161120212455/https://www.tcpdump.org/manpages/tcpdump.1.html. Accessed Feb. 26, 2019.
Carstens et al., Programming with pcap, 2002, 9 pages, Tim Carstens, https://web.archive.org/web/20161119095131/https://www.tcpdump.org/pcap.html. Accessed Feb. 26, 2019.
Contavalli et al., Client Subnet in DNS Queries, May 2016, 30 pages, IETF Trust and the persons identified as the document authors.

* cited by examiner

IDENTIFYING DEVICES ON A REMOTE NETWORK

CROSS-REFERENCE TO RELATED APPLICATIONS

This Application claims priority to U.S. Provisional Patent Application Ser. No. 62/592,980, filed Nov. 30, 2017, entitled "Identifying Devices on a Remote Network," the entire disclosure of which is incorporated herein by reference.

FIELD

The disclosure relates generally to network systems, and more particularly to identifying network devices on a remote network that utilizes a private address space, such as a home network.

BACKGROUND

The "Internet of Things" (IoT) is a term used to describe a network comprising many different types of devices, both traditional computers and devices that in the past were not capable of network communication. A "thing" in the IoT can be any type of device that can collect data and communicate data via a network. Examples of such devices include smart home appliances, sensors, biochips, implantable medical devices, and vehicle based devices. An IoT device can provide for control and automation of devices in a smart home, a smart grid, a smart factory, a smart city, an intelligent transportation system etc.

Providing security and/or control for IoT devices and other devices on a remote network can be difficult. One reason for the difficulty is that it can be challenging to identify the devices while traffic flows are monitored from outside the remote network, for example, by a remote security, control, or network intelligence platform.

SUMMARY

Systems and methods enable (i) receiving, by a device identification module connected to a broad network, a network device list, wherein the network device list includes an entry for each of one or more devices connected on a remote private address space network, (ii) observing, by the device identification module, at least one network packet on the broad network originating from a first device of the one or more devices connected on the remote private address space network and having an entry on the network device list, and (iii) identifying, by the device identification module, the entry on the network device list corresponding to the first device on the remote private address space network from which the observed network packet originated based, at least in part, on at least one member of the group consisting of: (a) Dynamic Host Configuration Protocol (DHCP) information for the remote private address space network, (b) port sequences used in Network Address Translation (NAT) on the remote private address space network, and (c) a live Uniform Resource Locator (URL) check performed on the remote private address space network.

BRIEF DESCRIPTION OF THE DRAWINGS

For a better understanding of the inventive subject matter, reference may be made to the accompanying drawings in which.

DETAILED DESCRIPTION

Figure 1:
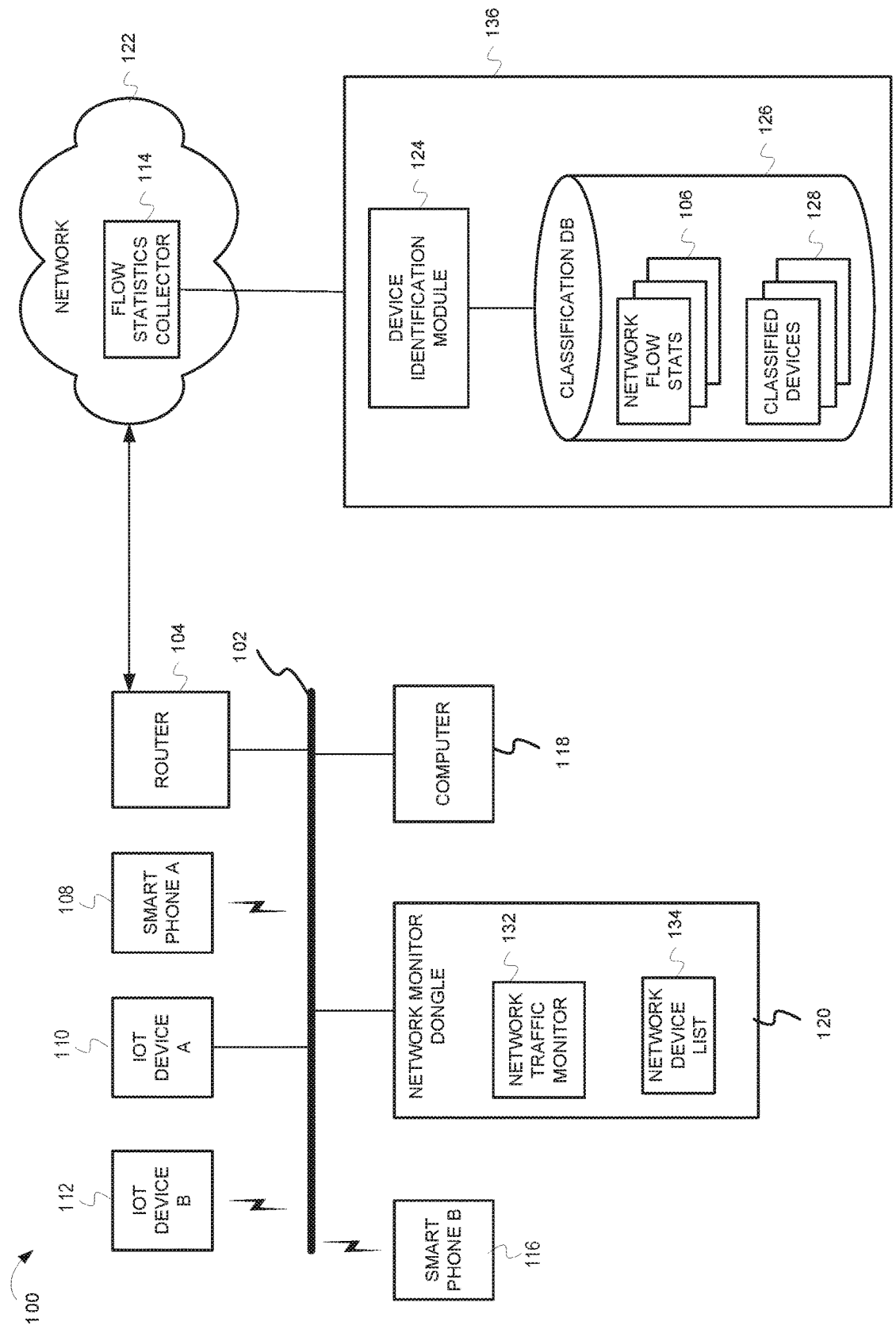
FIG. 1 is a block diagram illustrating an example system to identify devices on a remote network in accordance with one embodiment of the present invention.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Embodiments of the present invention include a device identification module that can use network flow statistics and, optionally, data from a network monitor dongle on a remote private address space (e.g., "local") network, such as a home network, to classify the devices on the private address space network such that they may be identified as specific devices, such as specific home devices. The device identification module can be part of a system that provides remote security and/or control services for the private address space network. In order to provide such services in an efficient and effective manner, the devices on the private address space network can be identified using network flow statistics and classifications determined using the flow statistics. Once a device is identified, the traffic flow associated with a particular device can be analyzed. As used herein, identification can include mapping an unknown device to a specific, single device in a network. Classification can include applying machine learning algorithms that allow an unknown device to be classified amongst a known set of device classes or device types.

One factor that makes such identification more difficult is the use of Network Address Translation (NAT). The Internet Protocol address space is limited, and so each private address space network (e.g., in a home, etc.) typically uses a local address space, for example, 192.168.1.x along with NAT. A router, or other device serving as a gateway router, employs NAT to allow any of the devices at home to communicate with the broader Internet. NAT accomplishes this by rewriting the Internet Protocol (IP) address of every local device in the IP header of network packets sent from/to the local devices with the IP address of the gateway device (e.g., router, etc.), and using TCP port numbers to demultiplex the traffic when it gets back. Table 1 below illustrates an example NAT table.

TABLE 1

| Device | Private Address Space ("Local") IP Address | Local Port | Destination address | NAT IP Address | NAT Port |
|---|---|---|---|---|---|
| Jon's iPad | 192.168.1.21 | 750 | facebook.com | 35.42.105.19 | 21750 |
| Jon's iPad | 192.168.1.21 | 751 | cnn.com | 35.42.105.19 | 21751 |
| Bill's iPad | 192.168.1.27 | 1546 | cnn.com | 35.42.105.19 | 1546 |
| TV | 192.168.1.40 | 550 | samsung.com | 35.42.105.19 | 550 |
| PC | 192.168.1.5 | 660 | cnn.com | 35.42.105.19 | 660 |

When a network packet is to be relayed from the private address space network to a remote network, the gateway device uses NAT to translate the private address space IP address to the gateway device IP address (e.g., 35.42.105.19), and maps the port number for the packet to a NAT port. For example, assume that Jon's iPad is communicating with cnn.com via local port 751. The outgoing packet's source IP address is mapped to the gateway IP address (the NAT IP address in Table 1). The outgoing packet's port is mapped to a unique port number that can be associated via the NAT table to Jon's iPad. When traffic comes back (e.g., from cnn.com), the router looks at the port number (e.g. 21751) to route it to Jon's iPad on port 751.

As can be seen from the above, it can be difficult to remotely (e.g., from outside the private address space network, such as over the Internet) identify network devices on a private address space network and associate network traffic, observed on a broader network having a public address space (e.g., the Internet), with particular devices on the private address space network, because all of the network devices on the private address space network appear to have the same IP address, that of the gateway device on the private address space network.

The systems and methods of the embodiments described herein can be used by a remote system to identify devices on a private address space network.

FIG. 1 is a block diagram illustrating an example system 100 to identify devices on a remote network according to embodiments. In some embodiments, system 100 can include a private address space (e.g., "local") network 102 configured to communicatively connect a router 104, IoT devices 110-112, smartphones 108 and 116, a computer 118, and a network monitor dongle 120. The network monitor dongle 120 can include a network traffic monitor 132 and a network device list 134. The system 100 can further include a public address space (e.g., "broad") network 122, a device identification module 124, and classification database 126. The public address space network 122 can include a flow statistics collector 114 and can be communicatively connected to the router 104, which can interface private address space network 102 and public address space network 122. The public address space network 122 can also be communicatively connected to the device identification module 124 and the classification database 126. The classification database 126 can store network flow statistics 106 and a classified devices list 128. In some embodiments, the device identification module 124 and the classification database 126 can comprise a platform 136.

Private address space network 102 is capable of facilitating the exchange of data (e.g., network packets, etc.) among router 104, smartphones 108 and 116, IoT devices 110-112, computer 118, and network monitor dongle 120. Private address space network 102 can be a wired network, a wireless network, or a combination of the two. In some embodiments, private address space network 102 can be a home network. In alternative embodiments, network 102 can be a network in a small business or a corporate network. The private address space network 102 includes networks that utilize a private IP address space. Although the geographic scale/spatial scope of private address space network 102 is not limited, examples of networks that can comprise private address space network 102 include, but are not limited to, a nanoscale network, a near-field network, a body area network (BAN), a personal area network (PAN), a near-me area network (NAN), a local area network (LAN), a wireless local area network (WLAN), a home area network (HAN), a storage area network (SAN), and a campus area network (CAN). In another embodiment, private address space network 102 is any medium that allows data to be physically transferred through serial or parallel communication channels (e.g., copper wire, optical fiber, computer bus, wireless communication channel, etc.).

The public address space network 122 is capable of facilitating the exchange of data (e.g., network packets, etc.) among router 104, device identification module 124, and classification database 126. Public address space network 122 can be any collection of one or more wired networks, wireless networks, or combinations of the two that cover a greater domain than private address space network 102. In some aspects, public address space network 122 can be one or more networks that make up the Internet. The public address space network 122 includes networks that utilize a public IP address space. Although the geographic scale/spatial scope of public address space network 122 is not limited, examples of networks that can comprise public address space network 122 include, but are not limited to, a backbone network, a metropolitan area network (MAN), a wide area network (WAN), a global area network (GAN), public switched telephone network (PSTN), and an Internet area network (IAN). In another embodiment, public address space network 122 is any medium that allows data to be physically transferred through serial or parallel communication channels (e.g., copper wire, optical fiber, computer bus, wireless communication channel, etc.).

An IoT device (e.g., IoT devices 110,112) can be any type of device that includes a processor and a network interface to communicate data via private address space network 102 and/or public address space network 122. Examples of such devices include, but are not limited to smart televisions, smart home appliances, sensors, biochips, office devices, implantable medical devices, and vehicle-based devices.

Computer 118 can be a server computer, a laptop computer, a tablet computer, a set-top box, video game console or any other device having a processor and memory enabling the device to execute programs.

Smartphones 108 and 116 can be any type of smartphone. Examples of smartphones include Android-based smartphones, iPhones, and Windows phones. The embodiments are not limited to any particular type of smartphone. Smartphone 108 may be the same type of phone as smartphone 116, or it may be a different type.

Router 104 is capable of forwarding network data (e.g., data packets) between private address space network 102 and public address space network 122. Router 104 can be a standalone router, a wireless router or access point, a modem/router or any other device that forwards data between two networks. In some embodiments, router 104 is capable of forwarding data packets between a first network (e.g., private address space network 102) or subnetwork that utilizes a first addressing scheme, such as a private IP address space, and a second network (e.g., public address space network 122) or subnetwork that utilizes a second addressing scheme, such as a public address space. For example, the router 104 may perform NAT by remapping one IP address space into another by modifying network address information in the IP header of packets while they are in transit across the router 104, as further described herein.

Network monitor dongle 120 can be a computing device similar to IoT devices 110, 112. The network monitor dongle 120 includes one or more processors, one or more memory devices, and a network interface device. Network monitor dongle 120 can be coupled to network 102 via the network interface device and a communication connection (either wireless, wired, or a combination of wired and wireless). A processor of network monitor dongle 120 can execute a network traffic monitor 132 that may monitor (also referred to as snooping or sniffing) packets on network 102 and use the data obtained from the monitoring to build a network device list 134 and store the network device list 134 on a memory device of network monitor dongle 120. Network traffic monitor 132 may also build the network device list by scanning the IP address range of private address space network 102 and sending probe packets (also called "pinging" or "port scanning") to each device IP address on the private address space network 102. In some embodiments, network traffic monitor 132 is provided as processor-executable instructions stored on a memory device that comprise a function, a routine, a method, and/or a subprogram of the network monitor dongle 120. Network device list 134 can be a list of device names for devices that network monitor dongle 120 discovers on network 102 along with their associated Media Access Control (MAC) address. In some embodiments, network monitor dongle 120 can respond to commands received from a remote source such as device identification module 124 as will be further described below. Network device list 134 will typically include the IP and MAC address of the identified or discovered devices on private address space network 102, together with any open ports, and can also include further identifying information observed on the private address space network 102 (e.g. browser agent string, Dynamic Host Configuration Protocol (DHCP) requests, etc.). These can be used to identify the devices within the private address space network 102.

Device identification module 124 observes network flow statistics 106 based on network traffic received from private address space network 102, as seen in the broader public address space network 122. The network flow statistics can be used along with other techniques described below to identify devices in a remote network (e.g., private address space network 102), even when the actual network addresses of the devices have been hidden due to the use of NAT. For example, device identification module 124 can use the network flow statistics 106 along with other data, such as the network device list 134 for private address space network 102, to identify and classify devices on private address space network 102 without having knowledge of the actual IP addresses or MAC addresses of devices within private address space network 102. For example, machine learning algorithms can be applied to the network flow statistics 106 to classify an unknown device amongst a known set of device classes or device types. The classified devices can be maintained in a classified devices list 128 stored in classification database 126. Device identification module 124 can be a standalone module, or it can be a component of another system or platform 136. For example, device identification module 124 can be a component of a network security system, a network control system, a network intelligence platform, or the like. The platform 136 can provide additional services such as malware detection, denial of service attack detection, botnet membership detection, or the like. Such services can use the device identifications provided by the device identification module 124 in order to provide such additional services. In some embodiments, device identification module 124 is provided as processor-executable instructions stored on a memory device that comprise a function, a routine, a method, and/or a subprogram of a computing device and/or platform 136.

In some embodiments, the network flow statistics 106 can be collected by a flow statistics collector 114. For example, an Internet Service Provider (ISP) that provides connectivity to the broader public address space network 122 can include flow statistics collector 114 as part of an ISP router used to route packets from private address space network 102 received via router 104 to a broader public address space network 122 managed by the ISP. For example, a router at the edge of the ISP network could include flow statistics collector 114. Alternatively, flow statistics collector 114 can be separate from an ISP router.

The functionality described as being provided by network monitor dongle 120 can be distributed to other components illustrated in FIG. 1 in alternative embodiments. For example, a computer 118 or router 104 could perform some or all of the functionality of network monitor dongle 120.

It should be noted that although only one private address space network 102 is illustrated in FIG. 1, device identification module 124 can receive data from many different private address space networks 102.

The number and types of devices illustrated in FIG. 1 is to be considered as an example. Those of skill in the art having the benefit of the disclosure will appreciate that a network 102 can include more or fewer devices and device types than that illustrated in FIG. 1.

Figure 2:
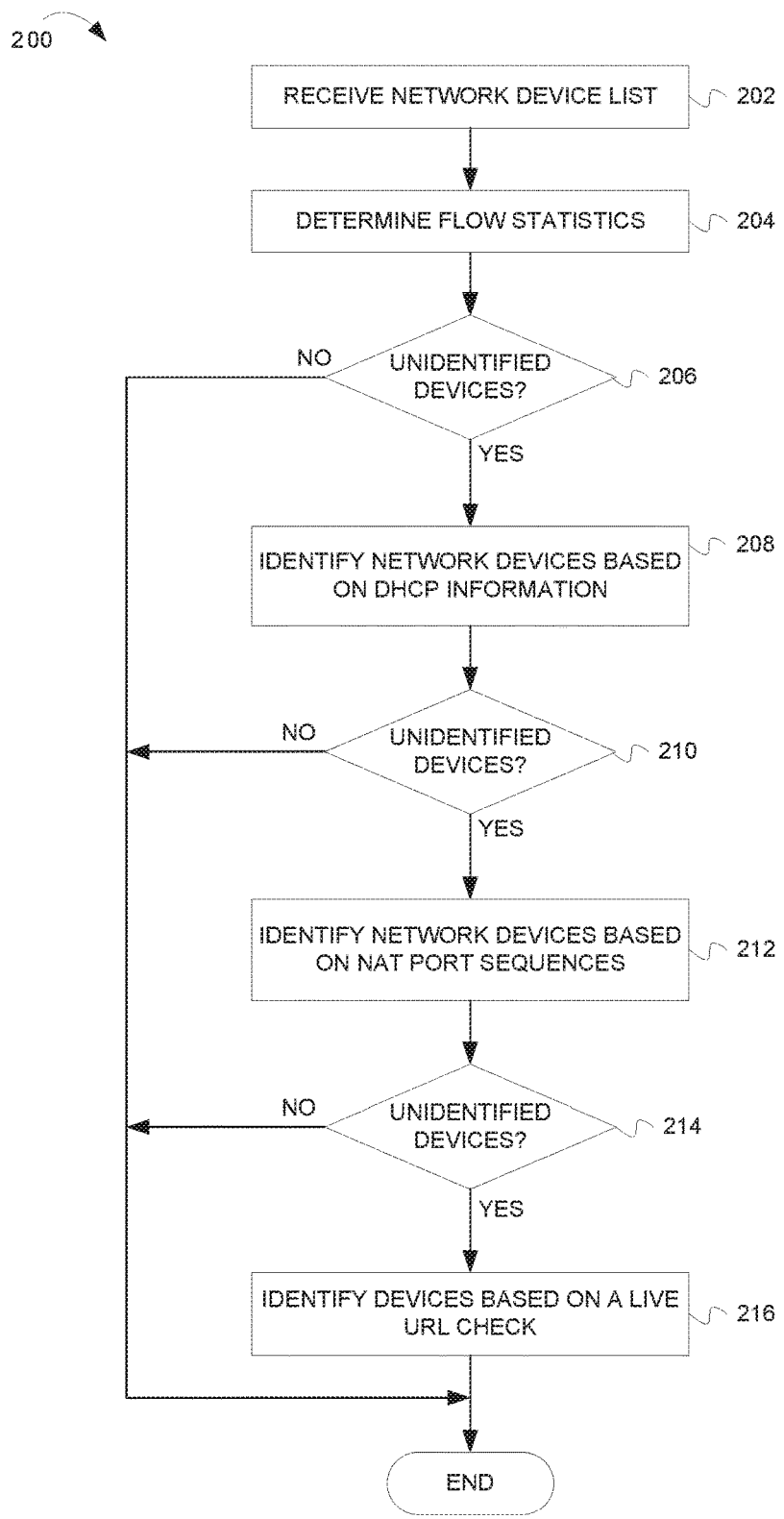
FIG. 2 is a flow chart illustrating operations of a method for identifying devices on a remote network in accordance with one embodiment of the present invention.

FIG. 2 is a flow chart 200 illustrating operations of a method for identifying devices on a remote network according to embodiments.

At block 202, a device identification module 124 can receive a network device list 134 for a private address space network 102. As noted above, the network device list 134 can include a list of devices on the private address space network 102 along with the MAC addresses of the devices. In some embodiments, block 202 can be referred to as receiving the network device list 134 from a remote network because the private address space network 102 is remote from the device identification module 124.

At block 204, the device identification module 124 can optionally determine network flow statistics for the private address space network 102. For example, flow statistics can be collected from a gateway device, such as router 104, or a router of an ISP providing network services to private address space network 102. For example, an ISP can include a flow statistics collector 114 in a router or as a separate device. The flow statistics can be used to classify and/or identify devices as described herein.

At block 206, a check can be made to determine if there are any unidentified devices on the private address space network 102. For example, the device identification module 124 can check to determine if any of the devices in the network device list 134 remain unidentified after the operations at blocks 202-204 have been performed.

When the check at block 206 determines that no devices are unidentified (i.e., all devices in the network device list 134 are identified), then the method ends. When the check at block 206 determines that one or more unidentified devices are present on private address space network 102 (i.e., at least one device in the network device list 134 is unidentified), then the method proceeds to block 208.

At block 208, the device identification module 124 attempts to identify devices using DHCP data. In some embodiments, software on a computer on private address space network 102 or on network monitor dongle 120 (e.g., network traffic monitor 132) can snoop DHCP requests. Because DHCP requests are broadcast packets, all stations on the network can see the DHCP requests. A DHCP request can include an optional parameter referred to as the DHCP Client Identifier. The DHCP Client Identifier is often set in a systematic way by different types of devices. For example, a DHCP Client Identifier of "ANDROID-XXXXYYYY" can indicate an Android device, "Joe's iPhone" can indicate an iPhone, etc. Thus, the DHCP Client Identifier can include information that can be used, along with the device fingerprint data determined using the network flow statistics and the network device list, in order to remotely identify and/or classify a network device on a private address space network. The DHCP data can be forwarded to the device identification module 124 from the computer 118 or network monitor dongle 120 on private address space network 102 for use in identifying devices on the private address space network 102.

At block 210, a check can be made to determine if there are any unidentified devices on the private address space network 102. For example, the device identification module 124 can check to determine if any of the devices in the network device list 134 remain unidentified after the operations at blocks 202-208 have been performed.

When the check at block 210 determines that no devices remain unidentified (i.e., all devices in the network device list 134 are identified), then the method ends. When the check at block 210 determines that one or more unidentified devices are present on private address space network 102 (i.e., at least one device in the network device list 134 is unidentified), then the method proceeds to block 212.

At block 212, the device identification module 124 can use sequences of port numbers in the network traffic to attempt to identify devices. This technique is based on the fact that devices often use sequential port number for their source port, and that a router (e.g., router 104) will typically attempt to assign the same source port during NAT. Thus, in the example described in Table 1, Jon's iPad can be on ports 750, 751, 752, etc. while Bill's iPad can be on 1546, 1547, 1548, etc. The clustering of port numbers can be used to identify a particular device on private address space network 102 and the network traffic associated with the device.

At block 214, a check can be made to determine if there are any unidentified devices on the private address space network. For example, the device identification module 124 can check to see if any of the devices in the network device list 134 remain unidentified after the operations at blocks 202-212 have been performed.

When the check at block 214 determines that no devices remain unidentified (i.e., all devices in the network device list 134 are identified), then the method ends. When the check at block 214 determines that one or more unidentified devices are present on private address space network 102 (i.e., at least one device in the network device list 134 is unidentified), then the method proceeds to block 216.

At block 216, the device identification module 124 can use a live URL (Uniform Resource Locator) check to identify a device. As an example, after block 212, the device identification module 124 may be left with two or three device choices as it attempts to classify a network flow and/or identify devices based on the network flow. As an example, the device identification module 124 may determine that there is a network flow to the domain "samsung.com" from one of three devices on private address space network 102 (call these P, Q, and R). The device identification module 124 can then issue a request to network monitor dongle 120 to briefly snoop packets on the private address space network 102 belonging to (e.g., originating from, addressed to, etc.) these three devices P, Q, and R. Alternatively, the device identification module 124 can issue a request to network monitor dongle 120 to briefly snoop all packets on the private address space network 102. In response to the request, the network monitor dongle 120 can check which of the three devices P, Q, R is currently connected to the domain "samsung.com", and report identification details associated with the device to the device identification module 124. After completion of the operation at block 216, the method ends. In an embodiment, any unidentified devices are classified as "unknown".

In some embodiments, after the method described herein ends, the traffic flows associated with particular devices identified by the method can continue to be analyzed. For example, platform 136 can utilize the identified devices on the network device list 134 to provide services such as malware detection, denial of service attack detection, botnet membership detection, or the like.

Those of skill in the art having the benefit of the disclosure will appreciate that the order of operations illustrated in FIG. 2 can vary from that shown. For example, various embodiments may use a different ordering than that shown in FIG. 2 based on the difficulty, resource costs, and benefits associated with an ordering.

The operations described above can be used in conjunction with other device classification and/or identification methods. For example, device fingerprinting or packet inspection can be used to classify and/or identify devices on the private address space network 102. The operations described above can be used instead of, or in addition to such device fingerprinting and/or packet inspection. For example, the device identification module 124 can use the network flow statistics to determine a device fingerprint for each of the devices on the private address space network 102. The device fingerprint, along with network device list 134 can be used in identifying a particular device. Additionally, the device identification module 124 can perform packet inspection to attempt to identify a device. For example, if the packet includes a browser string identifying a browser used on a device, the browser string can be used to classify a device as being of a certain type. However, there may be more than one device of the same type on a network, so other means can be used to distinguish two devices of the same type as described above.

Figure 3:
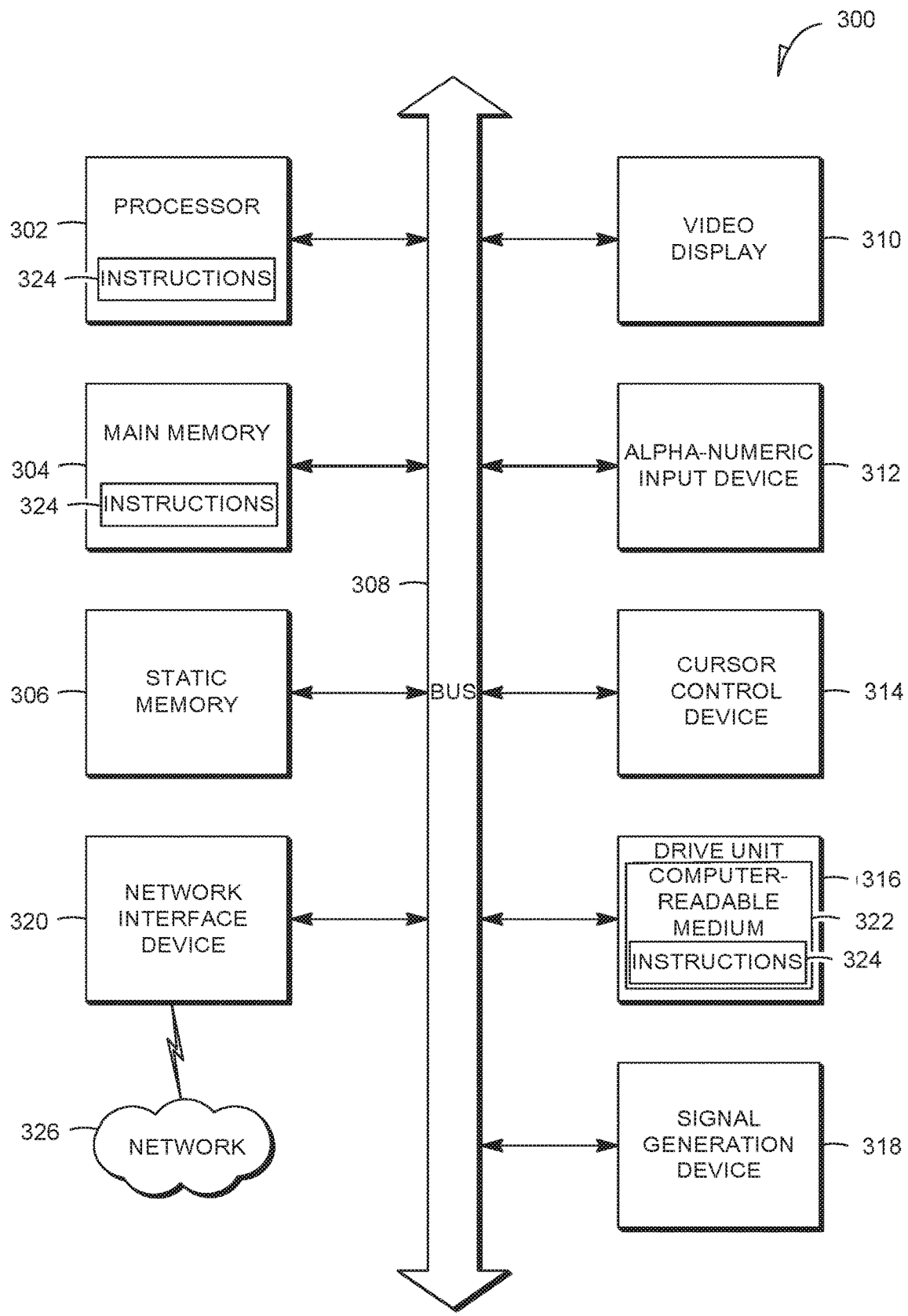
FIG. 3 is a block diagram of an example embodiment of a computer system upon which embodiments of the inventive subject matter can execute.

FIG. 3 is a block diagram of an example embodiment of a computer system 300 upon which embodiments of the inventive subject matter can execute. The description of FIG. 3 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 3 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smartphones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 3, an example embodiment extends to a machine in the example form of a computer system 300 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). In example embodiments, the computer system 300 also includes one or more of an alpha-numeric input device 312 (e.g., a keyboard), a user interface (UI) navigation device or cursor control device 314 (e.g., a mouse), a disk drive unit 316, a signal generation device 318 (e.g., a speaker), and a network interface device 320.

The disk drive unit 316 includes a machine-readable medium 322 on which is stored one or more sets of instructions 324 and data structures (e.g., software instructions) embodying or used by any one or more of the methodologies or functions described herein. The instructions 324 may also reside, completely or at least partially, within the main memory 304 or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 324 may further be transmitted or received over a communications network 326 using a signal transmission medium via the network interface device 320 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

In an embodiment, a method for identifying devices (e.g., IoT devices 110-112, smartphones 108 and 116, computer 118, etc.) includes a device identification module (e.g., device identification module 124) that is connected to a broad network (e.g., public address space network 122) receiving a network device list (e.g., network device list 134). The network device list can include an entry for each device of one or more devices (e.g., IoT devices 110-112, smartphones 108 and 116, computer 118, etc.) connected on a remote private address space network (e.g., private address space network 102). The method includes the device identification module observing network traffic (e.g., at least one network packet) on the broad network that originates from a first device of the one or more devices connected on the remote private address space network and having an entry on the network device list. The device identification module identifies the entry on the network device list that corresponds to the first device (i.e., the identified device) on the remote private address space network from which the observed network packet originated. The device identification module performs the identification based, at least in part, on at least one member of the group consisting of: DHCP information for the remote private address space network, port sequences used in NAT on the remote private address space network, a live URL check performed on the remote private address space network, and combinations thereof.

The DHCP information for the remote private address space network can include one or more DHCP client identifiers and the method can further include a second device (e.g., network monitor dongle 120, etc.) on the remote private address space network monitoring DHCP requests originating on the remote private address space network and forwarding the one or more DHCP client identifiers from the DHCP requests to the device identification module. Moreover, the identifying of the entry on the network device list corresponding to the first device on the remote private address space network from which the observed packet originated can further be based, at least in part, on the one or more DHCP client identifiers. The method can also include clustering the port sequences used by the one or more devices connected on the remote private address space network and the identifying of the entry on the network device list corresponding to the first device on the remote private address space network from which the observed packet originated can further be based, at least in part, on the clustered port sequences. Furthermore, the method can include determining that a plurality of the devices are unidentified on the remote private address space network and, in response to determining that one or more unidentified devices of the plurality of unidentified devices are communicating with a domain, issuing a request to a second device on the remote private address space network to initiate snooping on the remote private address space network. Moreover, the identifying of the entry on the network device list corresponding to the first device on the remote private address space network from which the observed packet originated can include receiving, from the second device, identification information indicating an unidentified device of the one or more unidentified devices that is communicating with the domain. In some embodiments, the method further includes providing one or more remote security services for the first device on the remote private address space network corresponding to the identified entry on the network device list by, at least in part, continually analyzing network packets on the broad network originating from the first identified device.

In another embodiment, a system includes a network interface device (e.g., network interface device 320), at least one processor (e.g., processor 302), and at least one non-transitory computer-readable storage medium (e.g., main memory 304, etc.). The network interface device is configured to communicatively connect the system to a broad network (e.g., public address space network 122). The at least one processor and the at least one memory are connected to each other and the network interface device by a bus (e.g., bus 308). The at least one non-transitory computer readable storage medium stores one or more processor-executable instructions (e.g., instructions 324) that, when executed by the at least one processor, provide a device identification module (e.g., device identification module 124). The device identification module is configured to receive a network device list (e.g., network device list 134) that includes an entry for each device of one or more devices (e.g., IoT devices 110-112, smartphones 108 and 116, computer 118, etc.) connected on a remote private address space network (e.g., private address space network 102). The device identification module is further configured to observe network traffic (e.g., at least one network packet) on the broad network that originates from a first device of the one or more devices connected on the remote private address space network and having an entry on the network device list. The device identification module is configured to identify the entry on the network device list that corresponds to the first device (i.e., the identified device) on the remote private address space network from which the observed network packet originated. The device identification module is configured to perform the identification based, at least in part, on at least one member of the group consisting of: DHCP information for the remote private address space network, port sequences used in NAT on the remote private address space network, a live URL check performed on the remote private address space network, and combinations thereof.

In yet another embodiment, a non-transitory computer readable storage medium (e.g., machine-readable medium 322, etc.) includes a set of instructions (e.g., instructions 324, etc.) executable by a computer. The non-transitory computer readable storage medium includes instructions for receiving, by a device identification module (e.g., device identification module 124) that is connected to a broad network (e.g., public address space network 122), a network device list (e.g., network device list 134). The network device list can include an entry for each device of one or more devices (e.g., IoT devices 110-112, smartphones 108 and 116, computer 118, etc.) connected on a remote private address space network (e.g., private address space network 102). The non-transitory computer readable storage medium also includes instructions for observing, by the device identification module, network traffic (e.g., at least one network packet) on the broad network that originates from a first device of the one or more devices connected on the remote private address space network and having an entry on the network device list. Moreover, the non-transitory computer readable storage medium includes instructions for identifying, by the device identification module, the entry on the network device list that corresponds to the first device (i.e., the identified device) on the remote private address space network from which the observed network packet originated. The device identification module performs the identification based, at least in part, on at least one member of the group consisting of: DHCP information for the remote private address space network, port sequences used in NAT on the remote private address space network, a live URL check performed on the remote private address space network, and combinations thereof.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for identifying devices, the method comprising:
    receiving, by a device identification module implemented by one or more hardware processors and connected to a broad network, a network device list, wherein the network device list includes an entry for each of one or more devices connected on a remote private address space network;
    observing, by the device identification module, at least one network packet on the broad network originating from a first device of the one or more devices connected on the remote private address space network and having an entry on the network device list;
    identifying, by the device identification module, the entry on the network device list corresponding to the first device on the remote private address space network from which the observed network packet originated based, at least in part, on at least one member of the group consisting of:
        Dynamic Host Configuration Protocol (DHCP) information for the remote private address space network wherein the DHCP information for the remote private address space network includes one or more DHCP client identifiers;
        port sequences used in Network Address Translation (NAT) on the remote private address space network; and
        a live Uniform Resource Locator (URL) check performed on the remote private address space network;
    monitoring, by a second device on the remote private address space network, DHCP requests originating on the remote private address space network; and
    forwarding, by the second device, the one or more DHCP client identifiers from the DHCP requests to the device identification module,
    wherein said identifying the entry on the network device list corresponding to the first device on the remote private address space network from which the observed packet originated is further based, at least in part, on the one or more DHCP client identifiers.

2. The method of claim 1, further comprising:
    clustering, by the device identification module, the port sequences used by the one or more devices connected on the remote private address space network,
    wherein said identifying the entry on the network device list corresponding to the first device on the remote private address space network from which the observed packet originated is further based, at least in part, on the clustered port sequences.

3. The method of claim 1, further comprising:
    determining, by the device identification module, that a plurality of the devices are unidentified on the remote private address space network; and
    in response to determining that one or more unidentified devices of the plurality of unidentified devices are communicating with a domain, issuing a request to a second device on the remote private address space network to initiate snooping on the remote private address space network,
    wherein said identifying the entry on the network device list corresponding to the first device on the remote private address space network from which the observed packet originated includes receiving, from the second device, identification information indicating an unidentified device of the one or more unidentified devices that is communicating with the domain.

4. The method of claim 1, wherein a router on the remote private address space network utilizes Network Address Translation.

5. The method of claim 1, wherein the one or more devices connected on the remote private address space network includes at least one Internet of Things (IoT) device.

6. The method of claim 1, wherein the device identification module receives the network device list from a network monitor dongle connected on the remote private address space network.

7. The method of claim 1, further comprising providing one or more remote security services for the first device on the remote private address space network corresponding to the identified entry on the network device list by, at least in part, continually analyzing, by the device identification module, network packets on the broad network originating from the first identified device.

8. A system comprising:
    a network interface device configured to communicatively connect the system to a broad network;
    at least one processor connected to the network interface device by a bus; and
    at least one non-transitory computer-readable storage medium connected to the network interface device and the at least one processor by the bus and storing one or more processor-executable instructions, the processor-executable instructions including instructions that, when executed by the at least one processor, provide a device identification module configured to:
        receive a network device list, wherein the network device list includes an entry for each of one or more devices connected on a remote private address space network;
        observe at least one network packet on the broad network originating from a first device of the one or more devices connected on the remote private address space network and having an entry on the network device list;
identify the entry on the network device list corresponding to the first device on the remote private address space network from which the observed network packet originated based, at least in part, on at least one member of the group consisting of:
Dynamic Host Configuration Protocol (DHCP) information for the remote private address space network wherein the DHCP information for the remote private address space network includes one or more DHCP client identifiers,
port sequences used in Network Address Translation (NAT) on the remote private address space network, and
a live Uniform Resource Locator (URL) check performed on the remote private address space network;
receive, from a second device on the remote private address space network, the one or more DHCP client identifiers from DHCP requests originating on the remote private address space network to the device identification module; and
identify the entry on the network device list corresponding to the first device on the remote private address space network from which the observed network packet originated based further on the one or more DHCP client identifiers.

9. The system of claim 8, wherein the device identification module is further configured to:
cluster the port sequences used by the one or more devices connected on the remote private address space network; and
identify the entry on the network device list corresponding to the first device on the remote private address space network from which the observed network packet originated based further on the clustered port sequences.

10. The system of claim 8, wherein the device identification module is further configured to:
determine that a plurality of the devices are unidentified on the remote private address space network; and
in response to determining that one or more unidentified devices of the plurality of unidentified devices are communicating with a domain, issue a request to a second device on the remote private address space network to initiate snooping on the remote private address space network,
wherein said identification of the entry on the network device list corresponding to the first device on the remote private address space network from which the observed packet originated includes receiving, from the second device, identification information indicating an unidentified device of the one or more unidentified devices that is communicating with the domain.

11. The system of claim 8, wherein a router on the remote private address space network utilizes Network Address Translation.

12. The system of claim 8, wherein the one or more devices connected on the remote private address space network includes at least one Internet of Things (IoT) device.

13. The system of claim 8, wherein the device identification module is configured to receive the network device list from a network monitor dongle connected on the remote private address space network.

14. The system of claim 8, the processor-executable instructions including instructions that, when executed by the at least one processor, provide a platform configured to continually analyze network packets on the broad network originating from the first identified device for providing one or more remote security services for the first identified device.

15. A non-transitory computer readable storage medium comprising a set of instructions executable by a computer, the non-transitory computer readable storage medium comprising:
instructions for receiving, by a device identification module implemented by one or more hardware processors and connected to a broad network, a network device list, wherein the network device list includes an entry for each of one or more devices connected on a remote private address space network;
instructions for observing, by the device identification module, at least one network packet on the broad network originating from a first device of the one or more devices connected on the remote private address space network and having an entry on the network device list;
instructions for identifying, by the device identification module, the entry on the network device list corresponding to the first device on the remote private address space network from which the observed network packet originated based, at least in part, on at least one member of the group consisting of:
Dynamic Host Configuration Protocol (DHCP) information for the remote private address space network wherein the DHCP information for the remote private address space network includes one or more DHCP client identifiers;
port sequences used in Network Address Translation (NAT) on the remote private address space network; and
a live Uniform Resource Locator (URL) check performed on the remote private address space network;
instructions for monitoring, by a second device on the remote private address space network, DHCP requests originating on the remote private address space network; and
instructions for forwarding, by the second device, the one or more DHCP client identifiers from the DHCP requests to the device identification module,
wherein said identifying the entry on the network device list corresponding to the first device on the remote private address space network from which the observed packet originated is further based, at least in part, on the one or more DHCP client identifiers.

16. The non-transitory computer readable storage medium of claim 15, further comprising:
instructions for clustering, by the device identification module, the port sequences used by the one or more devices connected on the remote private address space network,
wherein said identifying the entry on the network device list corresponding to the first device on the remote private address space network from which the observed packet originated is further based, at least in part, on the clustered port sequences.

17. The non-transitory computer readable storage medium of claim 15, further comprising:
instructions for determining that a plurality of the devices are unidentified on the remote private address space network; and instructions for, in response to determining that one or more unidentified devices of the plurality of unidentified devices are communicating with a domain, issuing a request to a second device on the remote private address space network to initiate snooping on the remote private address space network, wherein said identifying the entry on the network device list corresponding to the first device on the remote private address space network from which the observed packet originated includes receiving, from the second device, identification information indicating an unidentified device of the one or more unidentified devices that is communicating with the domain.

* * * * *